(12) United States Patent
Oda et al.

(10) Patent No.: US 9,357,380 B2
(45) Date of Patent: May 31, 2016

(54) SUBSCRIPTION MODULE ASSIGNMENT MANAGING SERVER AND SUBSCRIPTION MODULE ASSIGNMENT MANAGING METHOD

(75) Inventors: Toshikane Oda, Tokyo (JP); Johan Hjelm, Tokyo (JP); Ryoji Kato, Kanagawa (JP); Shingo Murakami, Kanagawa (JP); Shinta Sugimoto, Kanagawa (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 210 days.

(21) Appl. No.: 14/118,762

(22) PCT Filed: May 27, 2011

(86) PCT No.: PCT/SE2011/050665
§ 371 (c)(1),
(2), (4) Date: Nov. 19, 2013

(87) PCT Pub. No.: WO2012/166024
PCT Pub. Date: Dec. 6, 2012

(65) Prior Publication Data
US 2014/0162622 A1 Jun. 12, 2014

(51) Int. Cl.
*H04W 8/24* (2009.01)
*H04W 4/08* (2009.01)
*H04W 8/26* (2009.01)

(52) U.S. Cl.
CPC ............... *H04W 8/245* (2013.01); *H04W 4/08* (2013.01); *H04W 8/26* (2013.01)

(58) Field of Classification Search
CPC .................................................. H04W 8/245
See application file for complete search history.

(56) References Cited

U.S. PATENT DOCUMENTS

| | | | |
|---|---|---|---|
| 2003/0211840 A1* | 11/2003 | Castrogiovanni et al. | 455/405 |
| 2008/0261561 A1 | 10/2008 | Gehrmann | |
| 2009/0217348 A1 | 8/2009 | Salmela et al. | |
| 2010/0210304 A1* | 8/2010 | Huslak | 455/558 |
| 2011/0194553 A1* | 8/2011 | Sahin et al. | 370/352 |
| 2012/0054344 A1* | 3/2012 | Udani et al. | 709/226 |
| 2012/0108204 A1* | 5/2012 | Schell et al. | 455/411 |
| 2012/0108295 A1* | 5/2012 | Schell et al. | 455/558 |
| 2012/0260090 A1* | 10/2012 | Hauck et al. | 713/168 |

OTHER PUBLICATIONS

3rd Generation Partnership Project. "3GPP TR 33.812 V9.2.0 (Jun. 2012)," 3rd Generation Partnership Project; Technical Specification Group Services and System Aspects; Feasibility Study on the Security Aspects of Remote Provisioning and Change of Subscription for Machine to Machine (M2M) Equipment (Release 9); Jun. 22, 2010. pp. 1-87.

* cited by examiner

*Primary Examiner* — Mazda Sabouri
(74) *Attorney, Agent, or Firm* — Patent Portfolio Builders, PLLC (57) ABSTRACT

There is provided an apparatus (134) for managing assignment of subscription modules (307) for a group (141) of communication devices (140a-140n). The apparatus includes a receiving unit (203) configured to receive a request for assigning a subscription module to a target communication device (140j) so that the target communication device can attach to a network managed by a network (110) operator; and a control unit (205) configured to identify a group which includes the target communication device, determine whether the number of subscription modules which are assigned to the communication devices in the identified group reaches the upper bound, and when the number of the subscription modules does not reach the upper bound, assign a subscription module to the target communication device.

14 Claims, 9 Drawing Sheets

| Device ID | Operators | MCIM ID | State of | | | | Device ID | Operators | MCIM ID | State of | | | |
|---|---|---|---|---|---|---|---|---|---|---|---|---|---|
| | | | "I" | "A" | "S" | "B" | | | | "I" | "A" | "S" | "B" |
| D1 | Ope-1 | MCIM-1 |  | x |  |  | D6 | Ope-1 | MCIM-1 | x |  |  |  |
|  |  | MCIM-2 | x |  |  |  |  |  | MCIM-2 | x |  |  |  |
|  |  | MCIM-3 | x |  |  |  |  |  | MCIM-3 | x |  |  |  |
|  |  | MCIM-4 | x |  |  |  |  |  | MCIM-4 | x |  |  |  |
|  | Ope-2 | MCIM-5 |  |  | x |  |  | Ope-2 | MCIM-5 |  |  |  |  |
|  |  | MCIM-6 | x |  |  |  |  |  | MCIM-6 |  |  |  |  |
|  |  | MCIM-7 | x |  |  |  |  |  | MCIM-7 |  |  |  |  |
| D2 | Ope-1 | MCIM-1 | x |  |  |  | D7 | Ope-1 | MCIM-1 | x |  |  |  |
|  |  | MCIM-2 |  | x |  |  |  |  | MCIM-2 | x |  |  |  |
|  |  | MCIM-3 | x |  |  |  |  |  | MCIM-3 | x |  |  |  |
|  |  | MCIM-4 | x |  |  |  |  |  | MCIM-4 | x |  |  |  |
|  | Ope-2 | MCIM-5 | x |  |  |  |  | Ope-2 | MCIM-5 | x |  |  |  |
|  |  | MCIM-6 | x |  |  |  |  |  | MCIM-6 |  |  |  |  |
|  |  | MCIM-7 | x |  |  |  |  |  | MCIM-7 |  |  |  |  |
| D3 | Ope-1 | MCIM-1 | x |  |  |  | D8 | Ope-1 | MCIM-1 | x |  |  |  |
|  |  | MCIM-2 | x |  |  |  |  |  | MCIM-2 | x |  |  |  |
|  |  | MCIM-3 |  | x |  |  |  |  | MCIM-3 | x |  |  |  |
|  |  | MCIM-4 | x |  |  |  |  |  | MCIM-4 |  |  |  |  |
|  | Ope-2 | MCIM-5 | x |  |  |  |  | Ope-2 | MCIM-5 |  |  |  |  |
|  |  | MCIM-6 | x |  |  |  |  |  | MCIM-6 |  |  | x |  |
|  |  | MCIM-7 | x |  |  |  |  |  | MCIM-7 | x |  |  |  |
| D4 | Ope-1 | MCIM-1 | x |  |  |  | D9 | Ope-1 | MCIM-1 | x |  |  |  |
|  |  | MCIM-2 | x |  |  |  |  |  | MCIM-2 |  |  |  |  |
|  |  | MCIM-3 | x |  |  |  |  |  | MCIM-3 |  |  |  |  |
|  |  | MCIM-4 |  | x |  |  |  |  | MCIM-4 | x |  |  |  |
|  | Ope-2 | MCIM-5 | x |  |  |  |  | Ope-2 | MCIM-5 |  |  |  |  |
|  |  | MCIM-6 | x |  |  |  |  |  | MCIM-6 | x |  |  |  |
|  |  | MCIM-7 | x |  |  |  |  |  | MCIM-7 | x |  |  |  |
| D5 | Ope-1 | MCIM-1 | x |  |  |  | D10 | Ope-1 | MCIM-1 | x |  |  |  |
|  |  | MCIM-2 | x |  |  |  |  |  | MCIM-2 | x |  |  |  |
|  |  | MCIM-3 | x |  |  |  |  |  | MCIM-3 |  |  |  |  |
|  |  | MCIM-4 | x |  |  |  |  |  | MCIM-4 |  |  |  |  |
|  | Ope-2 | MCIM-5 | x |  |  |  |  | Ope-2 | MCIM-5 | x |  |  |  |
|  |  | MCIM-6 | x |  |  |  |  |  | MCIM-6 | x |  |  |  |
|  |  | MCIM-7 | x |  |  |  |  |  | MCIM-7 |  | x |  |  |

"I":Installed,"A":Activated,"S":Selected,"B":Blocked

FIG. 8

| Date and time slot | Deactivated MCIMs | Currently activated MCIMs | | | |
|---|---|---|---|---|---|
| | | Priority=1 | Priority=2 | Priority=3 | ... |
| Jan-14, 00:00-03:00 | MCIM-11, MCIM-26 | MCIM-9 for D5 | MCIM-8 for D35 | MCIM-18 for D21 | ... |
| Jan-14, 03:00-06:00 | MCIM-11, MCIM-26 | MCIM-9 for D5 | MCIM-8 for D35 | MCIM-18 for D21 | ... |
| Jan-14, 06:00-09:00 | MCIM-11 | MCIM-9 for D5 | MCIM-8 for D35 | MCIM-18 for D21 | ... |
| Jan-14, 09:00-12:00 | | MCIM-9 for D5 | MCIM-8 for D35 | | |
| Jan-14, 12:00-15:00 | | MCIM-9 for D5 | MCIM-8 for D35 | | |
| Jan-14, 15:00-18:00 | | MCIM-4 for D27 | | | |
| Jan-14, 18:00-21:00 | | | | | |
| Jan-14, 21:00-24:00 | | | | | |
| Jan-15, 00:00-03:00 | MCIM-11, MCIM-26 | MCIM-9 for D5 | MCIM-8 for D35 | MCIM-18 for D21 | |
| Jan-15, 03:00-06:00 | MCIM-11, MCIM-26 | MCIM-9 for D5 | MCIM-8 for D35 | MCIM-18 for D21 | |
| Jan-15, 06:00-09:00 | MCIM-11 | MCIM-9 for D5 | MCIM-8 for D35 | MCIM-18 for D21 | |
| Jan-15, 09:00-12:00 | | MCIM-9 for D5 | MCIM-8 for D35 | | |
| Jan-15, 12:00-15:00 | | MCIM-9 for D5 | MCIM-8 for D35 | | |
| Jan-15, 15:00-18:00 | | MCIM-4 for D27 | | | |
| Jan-15, 18:00-21:00 | | | | | |
| Jan-15, 21:00-24:00 | | | | | |
| Jan-16, 00:00-03:00 | MCIM-11, MCIM-26 | MCIM-9 for D5 | MCIM-8 for D35 | MCIM-18 for D21 | |
| Jan-16, 03:00-06:00 | MCIM-11, MCIM-26 | MCIM-9 for D5 | MCIM-8 for D35 | MCIM-18 for D21 | |
| Jan-16, 06:00-09:00 | MCIM-11 | MCIM-9 for D5 | MCIM-8 for D35 | MCIM-18 for D21 | |
| Jan-16, 09:00-12:00 | | MCIM-9 for D5 | MCIM-8 for D35 | | |
| Jan-16, 12:00-15:00 | | MCIM-9 for D5 | MCIM-8 for D35 | | |
| Jan-16, 15:00-18:00 | | MCIM-4 for D27 | | | |
| Jan-16, 18:00-21:00 | | | | | |
| Jan-16, 21:00-24:00 | | | | | |
| ... | | ... | ... | ... | |

| Group ID | Device ID | No. of Assigned MCIMs | Upper Limit | No. of MCIMs in Pool |
|---|---|---|---|---|
| G1 | D1 to D10 | 7 | 7 | 7 |
| G2 | D11 to D25 | 3 | 10 | 20 |
| ... | ... | ... | ... | ... |

FIG. 10

| Group ID | MCIM ID | IMSI | Secret Key |
|---|---|---|---|
| G1 | MCIM-1 | IMSI-1 | K-1 |
| | MCIM-2 | IMSI-2 | K-2 |
| | MCIM-3 | IMSI-3 | K-3 |
| | MCIM-4 | IMSI-4 | K-4 |
| | MCIM-5 | IMSI-5 | K-5 |
| | MCIM-6 | IMSI-6 | K-6 |
| | MCIM-7 | IMSI-7 | K-7 |
| G2 | ... | ... | ... |
| ... | ... | ... | ... |

SUBSCRIPTION MODULE ASSIGNMENT MANAGING SERVER AND SUBSCRIPTION MODULE ASSIGNMENT MANAGING METHOD

TECHNICAL FIELD

The present invention generally relates to a server and method for managing assignment of subscription modules.

BACKGROUND

Downloadable SIM (Subscription Identity Module) has been gaining lots of attentions and interests in the mobile communication field as a new scheme to realize flexible subscription management and connectivity provisioning. The MCIM (Machine Communication Identity Module) is one of the downloadable SIM to be remotely provisioned to communication devices. There will be a huge number of devices used and connected via the mobile network in the world in future, and each of the users will use multiple devices. However, the devices are not always used (for example, powered on and off) and do not always need to have connection and subscription for the connectivity during the period of being unused. This fact implies that it is not necessary to keep all the communication devices to be provisioned with the subscriptions for mobile network connectivity all the way and thus it is quite feasible to share the connectivity subscriptions in a group of devices so as to reduce the cost to be paid for the connectivity subscriptions.

US 2008/0261561 provides a technique for transferring a secure soft-SIM (SSIM) from a source mobile device to a target mobile device. However, this document deals only with the case where the two mobile devices are connected and communicate with each other and the transfer is performed between the currently connected devices. It is cumbersome for the user to keep track of changing status in terms of assignment (activation and deactivation) of his/her subscription modules (such as MCIMs) to his/her devices. Thus, it is desirable to automatically manage the subscription assignment between communication devices in a group.

SUMMARY

The present invention is intended to address the above-described problem, and it is a feature thereof to introduce an improved technology for managing assignment of subscription modules between communication devices in a group. According to an aspect of the present invention, there is provided an apparatus for managing assignment of subscription modules for a group of communication devices. The apparatus includes a receiving unit configured to receive a request for assigning a subscription module to a target communication device so that the target communication device can attach to a network managed by a network operator; and a control unit configured to identify a group which includes the target communication device, determine whether the number of subscription modules which are assigned to the communication devices in the identified group reaches the upper bound, and when the number of the subscription modules does not reach the upper bound, assign a subscription module to the target communication device.

Further features of the present invention will become apparent from the following description of exemplary embodiments with reference to the attached drawings, in which like reference characters designate the same or similar parts throughout the figures thereof.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Some embodiments of the present invention provide techniques for managing assignment of subscription modules between communication devices in a group. In the following description, a subscription module is an application used for a communication device to attach to a mobile network managed by a network operator. The subscription module typically includes a subscription identity, which identifies a subscription established between a subscriber and a network operator, and a credential, which the network operator uses to authenticate the subscriber or perform mutual authentication between the network and subscriber. Examples of the subscription module include SIM (Subscriber Identity Module), USIM (Universal Subscriber Identity Module), and ISIM (IMS Subscriber Identity Module), which are typically located on a UICC (Universal Subscriber Identity Module) to be inserted to a communication device, as well as MCIM (Machine Communication Identity Module) and a subscription module used for Embedded SIM, which are typically downloaded to a communication device. The following embodiments are described in the context of MCIM, which is defined in 3GPP TR 33.812, but the present invention can apply to any type of subscription modules. For example, in case of an embedded SIM, a USIM may be used to represent the subscription to the 3G cellular mobile network. The subscriber may be a user (owner) of the communication devices or a service provider which provides services to communication devices by use of MCIMs. The service provider may own MCIMs and provide the connectivity to its users as a part of its services. In this case, it is desirable to manage assignment of the MCIMs to the communication devices if the service provider wants to optimize the cost for the connectivity service.

Figure 1:
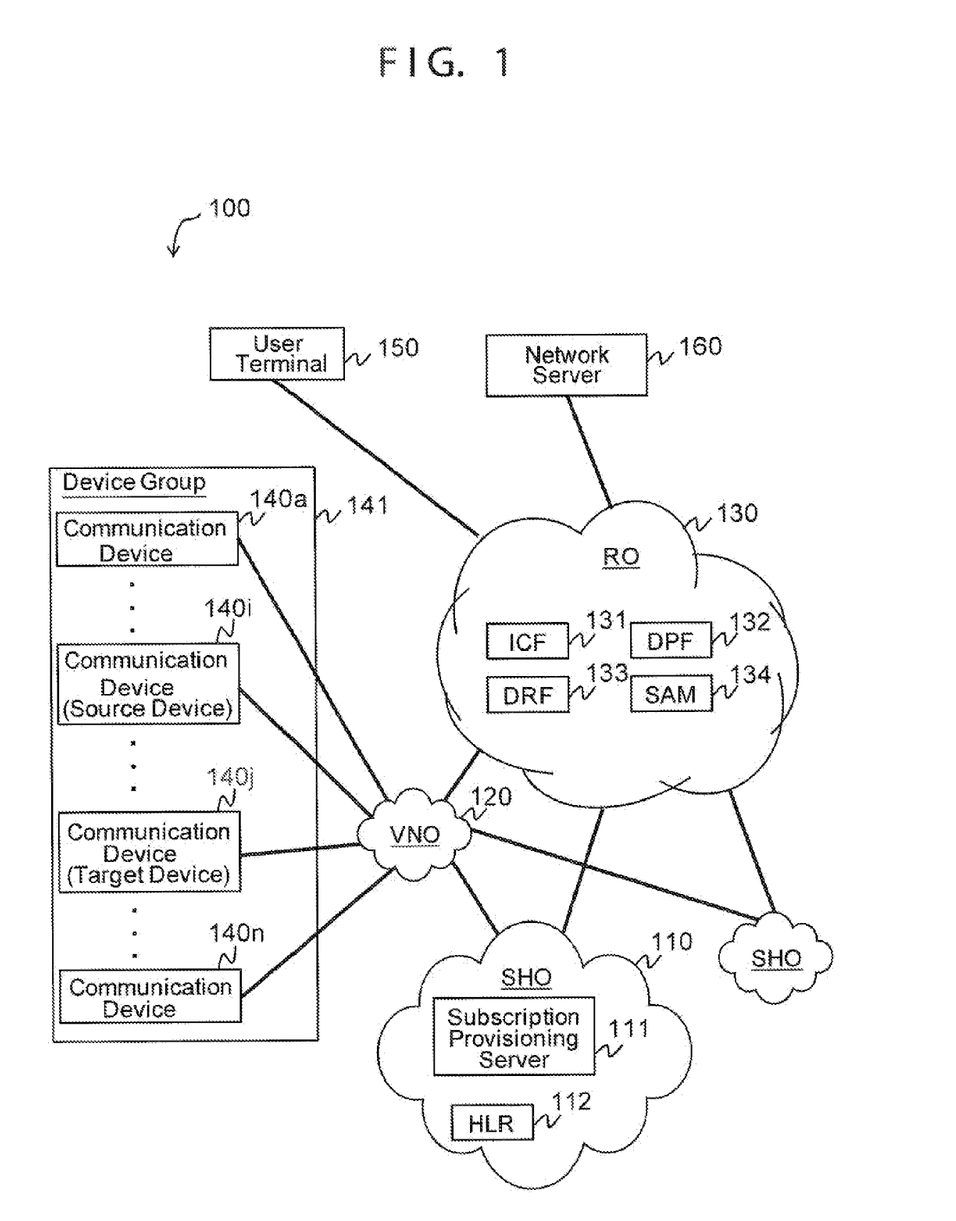
FIG. 1 illustrates an exemplary overall system 100 according to some embodiments of the present invention.

FIG. 1 illustrates an exemplary overall system 100 according to some embodiments of the present invention. The system 100 may include networks 110, 120, and 130, communication devices 140a-140n, a user terminal 150, and a network server 160. The communication devices 140a-140n are collectively referred as a communication device 140 if description of the communication device 140 is applicable to any of the communication devices 140a-140n.

The network 110 is a network managed by a selected home operator (SHO). The network 110 may be also referred as an SHO network 110. The system 100 may include a plurality of networks 110 which are managed by different SHOs. The SHO is a network operator which has capability of providing network connectivity to the communication device 140. One or more SHOs are selected from a plurality of network operators to provide network connectivity services for the communication device 140. The network 110 includes a subscription provisioning server 111 which managed by the SHO to perform MCIM-related operations such as issue, activation, and deactivation of an MCIM upon request. The network 110 also includes a home location register (HLR) which stores information relating to subscription.

The network 120 is a network managed by a visited network operator (VNO). The network 120 may be also referred as a VNO network 120. The VNO 120 provides temporary 3GPP network access to the communication device 140, where authentication using credentials such as a PCID (Provisional Connectivity Identity) may be required. The VNO 120 may provide full or restricted connectivity during initial access.

The network 130 is a network managed by a registration operator (RO). The network 130 may be also referred as an RO network 130. The RO provides initial connectivity to the communication device 140 and provides registration and provisioning functions for the communication device 140. The network 130 may includes an initial connectivity function (ICF) 131, an MCIM download and provisioning function (DPF) 132, and a discovery and registration function (DRF) 133, which are defined in TR 33.812, as well as a subscription assignment manager (SAM) 134. Each of the ICF 131, the DPF 132, the DRF 133, and the SAM 134 may be implemented in the form of server. According to the embodiments illustrated with reference to FIG. 1, the SAM 134 is included in the RO network 130, but the SAM 134 may be included in other network such as a service provider's private network and a corporate user's network.

The ICF 131 provides connectivity services (at layers above the basic network access provided by the VNO 120). The ICF 131 also provides network connectivity for the communication device 140 to request downloading and provisioning of MCIM credentials and applications from the DPF 132 via the VNO 120. The DPF 132 provides a function for managing the downloading and provisioning of an MCIM to the communication device 140. The DRF 133 helps the communication device 140 to discover and register with SHO. The SAM 134 manages assignment of MCIMs as described in detail below.

The communication device 140 is a device which can attach to the SHO network 110 when an MCIM which has been issued by the SHO is installed and activated in the communication device 140. Examples of the communication device 140 include a mobile phone, a personal computer, a navigation device in a vehicle, a security camera, and so on. In this description, the states defined in 3GPP TR 33.812 are used to represent states of MCIMs. The state "installed" represents that an MCIM is stored in the communication device 140; the state "activated" represents that an installed MCIM is authorized for operational use by the SHO which has issued the MCIM; the state "selected" represents that an activated MCIM is of operational use and the communication device 140 attaches to the SHO network 110; the state "blocked" represents that an activated MCIM is deactivated so as not to attach to the network 110 without authorization. When the communication device 140 is detached from the SHO network 110, the state of the MCIM changes from "selected" to "activated".

In some embodiments, an MCIM is installed in only a single communication device 140 at the same time. This means that, if an MCIM which is already installed in the communication device 140a needs to be activated and used by the communication device 140n to set up a connection, then the MCIM is to be deleted from the communication device 140a and then installed and activated in the communication device 140n. In other embodiments, the same MCIM may be installed in a plurality of communication devices 140 at the same time. This means that the same MCIM may be installed in two communication devices 140a, 140n at the same time, but the MCIM can be activated for only one of the two communication devices at the same time.

In some embodiments, it is assumed that the SHO charges a subscriber depending on the number of the MCIMs which has been issued for the subscriber. In such embodiments, it is desirable that the same MCIM is reused among a plurality of communication devices 140a-140n owned by the subscriber so that the subscriber can reduce the number of MCIMs to be issued in order to reduce cost. In other embodiments, it is assumed that the SHO charges a subscriber depending on the number of the MCIMs which are used by communication devices 140 of the subscriber to attach to the SHO network 110 at the same time. In such embodiments, it is desirable that the subscriber defines a device group 141 which includes a plurality of communication devices 140a-140n owned by the subscriber, and sets the upper bound for the device group 141 regarding the maximum number of MCIMs which are used by the communication devices 140a-140n to attach to the SHO network 110 at the same time so that the subscriber can cap the cost for subscription. The upper bound is typically less than the number of the communication devices 140a-140n in the device group 141. The present invention also applies to the combination of above mentioned charging scenarios.

The user terminal 150 may be used by an owner (who may be a subscriber) of the communication device 140 to send a request to the SAM 134. The network server 160 may be used by a service provider to send a request to the SAM 134. The subscriber may send the request from one of the communication devices 140a-140n which can communicate with the SAM 134. The request to be sent to the SAM 134 may be any one of an assignment request, a release request, and a replacement request.

The assignment request is a request for assigning an MCIM to a communication device 140 in a device group 141. A communication device 140 which is requested to be assigned an MCIM is referred as a target device. When the SAM 134 assigns an MCIM to a target device, the MCIM is installed to the target device if it is not installed, and activated. Accordingly, the target device becomes able to use the assigned MCIM to attach to the SHO network 110 where the MCIM is used to authenticate the subscriber to the SHO network 110. In the assignment request, the subscriber typically designates a target device. The subscriber may or may not designate an MCIM to be assigned in the request. The subscriber may designate two or more MCIMs. In this case, the SAM 134 selects an MCIM which can be assigned from the designated MCIMs. When any MCIMs are not designated in the request, the SAM 134 selects an MCIM from available MCIMs.

The release request is a request for releasing an MCIM from a communication device 140 in a device group 141. A communication device 140 which is requested to release an MCIM is referred as a source device. When the SAM 134 releases an MCIM from a source device, the source device cannot attach to the SHO network 110 using the released MCIM. One way to ensure that the source device cannot attach to the SHO network 110 is that the released MCIM is deactivated in the source device. In this case, the released MCIM can be assigned to another communication device 140 because there is not a risk that the source device uses the deactivated MCIM to attach to the SHO network 110. Another way is that the released MCIM is deactivated in the SHO network 110. In this case, the released MCIM cannot be assigned to another communication device 140 because the SHO will reject an attach request using the deactivated MCIM. In the release request, the subscriber typically designates a source device. The subscriber may or may not designate an MCIM to be released in the request. The subscriber may designate two or more MCIMs. In this case, the SAM 134 selects an MCIM which can be deactivated from the designated MCIMs. When any MCIMs are not designated in the request, the SAM 134 selects an MCIM from the activated MCIMs in the source device.

The replacement request is a request to re-assign an MCIM that is assigned to a communication device (source device) to another communication device (target device). In other word, the replacement request is a request including both the release request and the assignment request. In the replacement request, the subscriber typically designates both the source device and the target device. The subscriber may or may not designate an MCIM to be used in the replacement, such as the other requests.

Any type of requests may designate a group ID for identifying a device group including a source device and/or a target device so that the SAM 134 can identify the device group in case that the source device and/or the target device is included in two or more device groups. In the following description, it is assumed that a communication device 140$i$ is designated as a source device and a communication device 140$j$ is designated as a target device.

Figure 2:
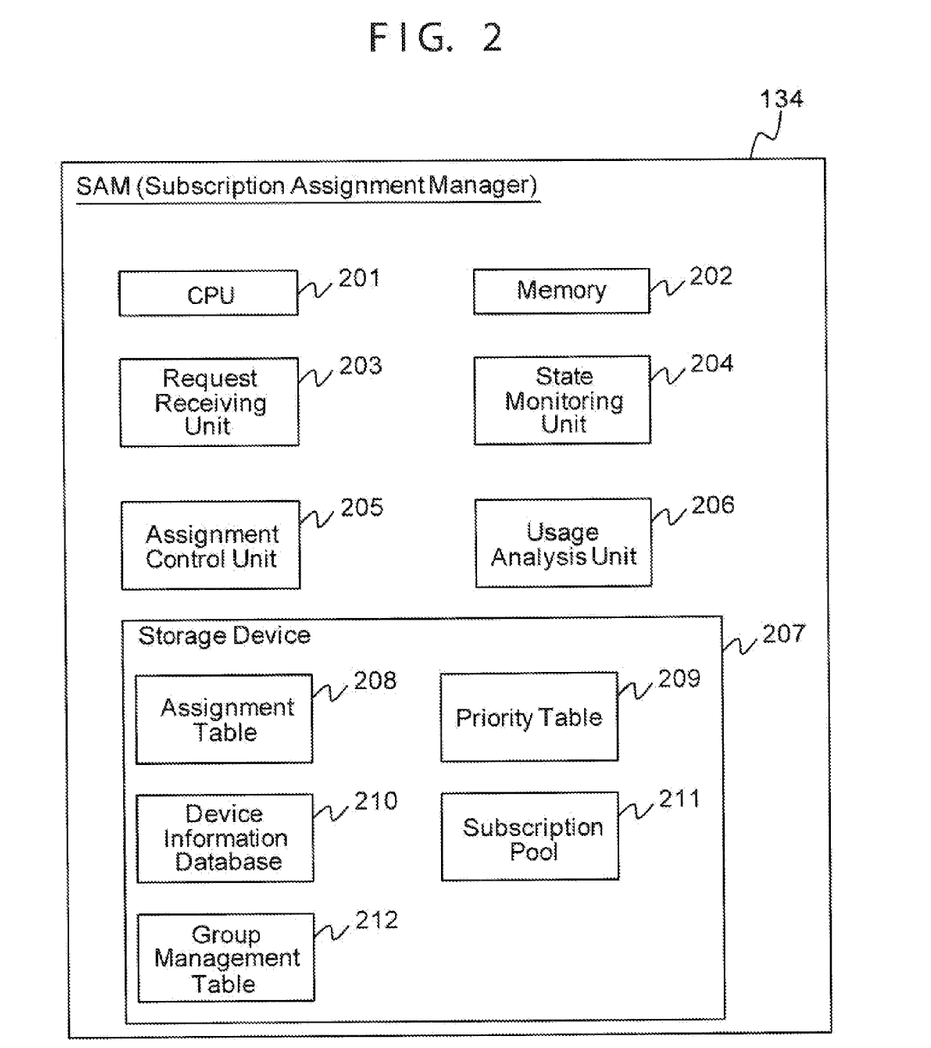
FIG. 2 illustrates an exemplary block diagram of the SAM 134.

FIG. 2 illustrates an exemplary block diagram of the SAM 134. The SAM 134 may comprise a CPU 201, a memory 202, a request receiving unit 203, a state monitoring unit 204, an assignment control unit 205, a usage analysis unit 206, and storage device 207. The CPU 201 controls overall operations of the SAM 134. The memory 202 stores computer programs and data used for operations of the SAM 134. The storage device 207 is typically implemented by a nonvolatile storage device such as a hard disk drive and stores an assignment table 208, a priority table 209, a device information database 210, a subscription pool 211, and a group management table 212.

The request receiving unit 203 receives a request as described above, for example from the user terminal 150 or the network server 160. In some embodiments, the request receiving unit 203 may provide the user of the communication devices 140 with a web interface through which the user can input the request. In other embodiments, the request receiving unit 203 may receive the request in the form of an SMS mail or a SOAP message for example, so that a server such as the network server 160 can send the request to the SAM 134 during its procedure where the network server 160 may be operated in a corporate network or by a service provider.

The assignment control unit 205 controls assignment of MCIMs to the communication devices 140 in the device group 141. The details of the assignment control unit 205 will be described below with reference to flowcharts.

Figure 9:
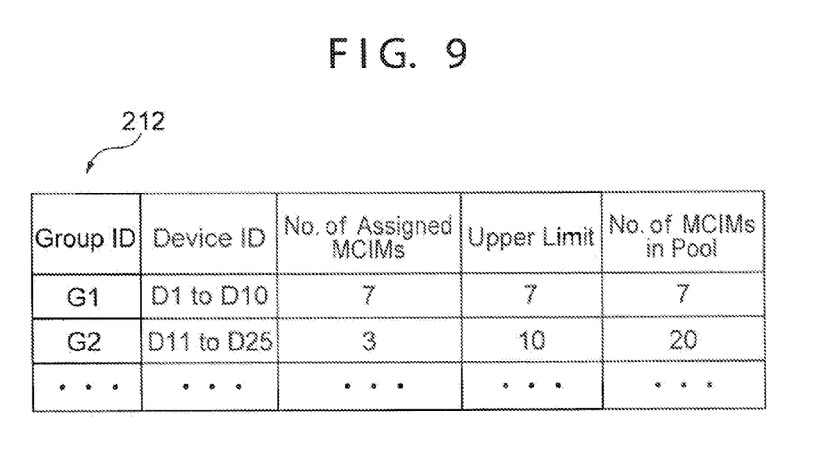
FIG. 9 illustrates an example of the group management table 212.

FIG. 9 illustrates an example of the group management table 212 which maintains groups of communication device 140, the number of currently assigned MCIMs, and the upper limit. The column of "Group ID" lists group IDs of device groups for which the SAM 134 provides the service of assignment management. The column of "Device ID" lists IDs of communication devices 140 included in each device group. The column of "No. of Assigned MCIMs" lists the number of MCIMs which are currently assigned to the communication devices in each device group. The column of "Upper Limit" lists the upper limit of the number of MCIMs which can be assigned to the communication devices 140 in each device group. The column of "No. of MCIMs in Pool" lists the number of MCIMs which are currently stored in the subscription pool 211 for each device group. The group, the communication devices 140 included in the group, and the upper limit may be set and updated by the user of the assignment managing service. The number of MCIMs currently assigned may be updated by the SAM 134 as described below.

Figure 10:
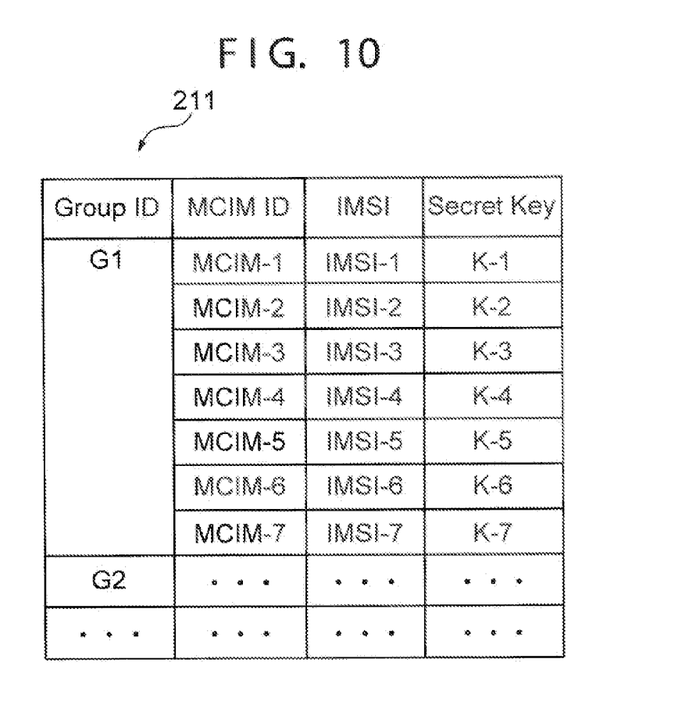
FIG. 10 illustrates an example of the subscription pool 211.

FIG. 10 illustrates an example of the subscription pool 211 which maintains MCIMs which can be assigned to communication devices 140 in each device group. FIG. 10 shows entries for the device group "G1" and the subscription pool 211 also maintains other entries for other device groups. The column of "Group ID" lists group IDs of device groups for which the SAM 134 provides the assignment management service. The column of "MCIM ID" lists IDs of MCIMs which are obtained for each device group. According to some embodiments, when the upper limit for the device group 141 is set, the SAM 134 may obtain the same number of MCIMs for each device group as the upper limit and store the obtained MCIMs in the subscription pool 211. According to other embodiments, the SAM 134 may obtain an MCIM when there is no available MCIM stored in the subscription pool 211 to assign to a target communication device 140$j$, and store the obtained MCIM in the subscription pool 211. According to yet other embodiments, the SAM 134 may obtain more number of MCIMs than the upper limit and store the obtained MCIMs in the subscription pool 211.

The state monitoring unit 204 monitors state of each MCIM stored in the communication device 140 and updates the assignment table 208. The state monitoring unit 204 collects information relating to the MCIMs. The information to be collected may include MCIM IDs of the MCIMs which is currently stored in the communication device 140 and a state of each MCIM. The state monitoring unit 204 may receive the information included in periodical keep-alive messages, may request the communication device 140 to send the information, or any combination of them.

Figure 7:
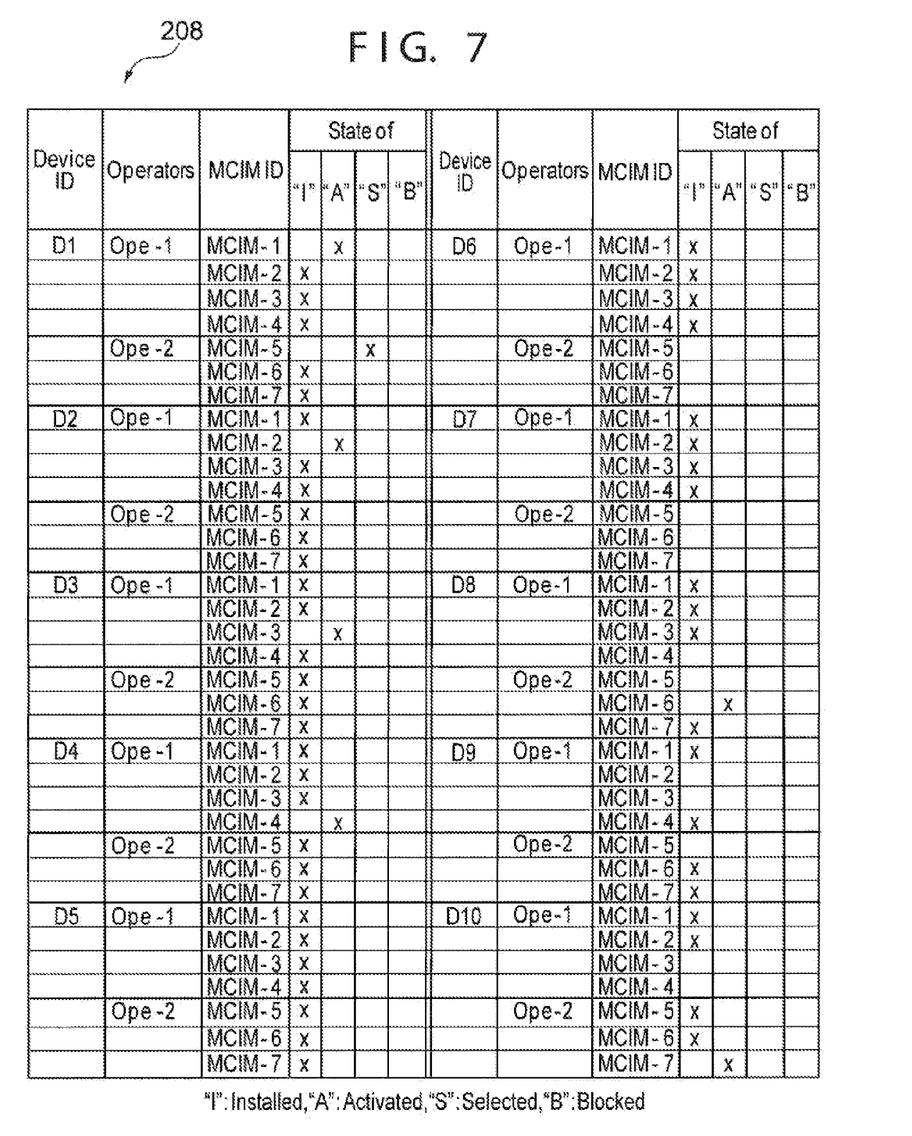
FIG. 7 illustrates an example of the assignment table 208.

FIG. 7 illustrates an example of the assignment table 208 which maintains states of the MCIMs which can be used for the communication devices 140 in the device group 141. FIG. 7 shows entries for the device group "G1" and entries for other device groups are not shown.

The usage analysis unit 206 obtains a state of the communication device 140 from the state monitoring unit 204 and analyses the connectivity patterns and usage patterns of the communication device 140. The connectivity patterns include history of the connectivity of the communication device 140 to the network such as historical data indicating time windows for which the communication device 140 is connected with larger probability. The usage patterns of the communication device 140 include history of usage of the communication device 140 irrespective of the connectivity to the network, and the usage pattern information may be used as additional information to the connectivity pattern information. The usage analysis unit 206 creates/updates the priority table 209 based on its analysis. The priority table 209 provides a priority order of the candidate MCIMs with which the assignment control unit 205 can find the activated MCIM in the communication devices 140 with higher probability that the MCIM for a communication device 140 is not used during a certain period of time. The usage analysis unit 206 may create/update the priority table 209 further by using the device information from the device information database 210, such as the capabilities, functions, applications and specifications supported by the communication device 140 and device priority which has designated by the user of the device.

Figure 8:
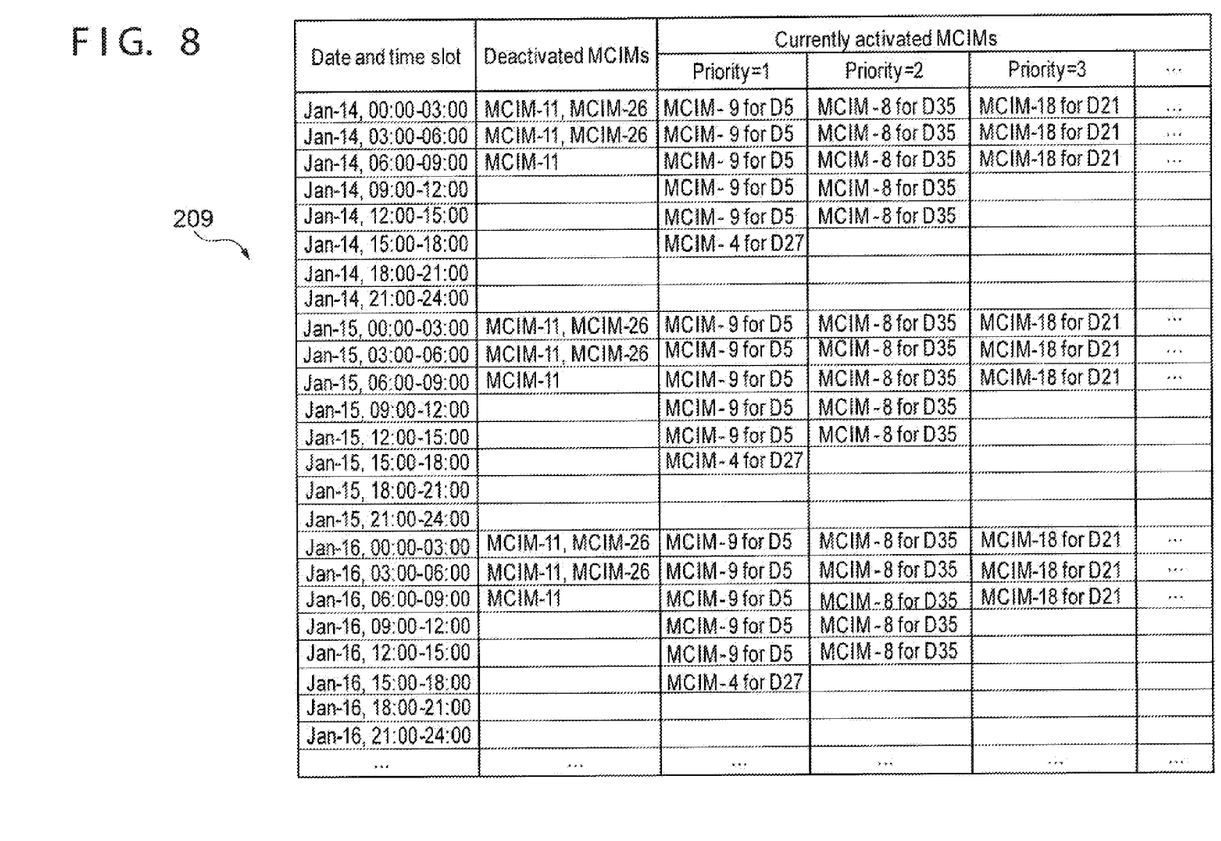
FIG. 8 illustrates an example of the priority table 209.

FIG. 8 illustrates an example of the priority table 209 which maintains priorities of the MCIMs. The column of "Deactivated MCIMs" lists the MCIMs which are not assigned (that is, the state is "installed" or "blocked") during the corresponding time slots. The columns of "Currently activated MCIMs" and "priority=1" indicates the MCIM which is currently assigned for the designated device during the time slot but is to be selected as the candidate to be deactivated for that device to make it able to be used (activated) for other devices.

Figure 3:
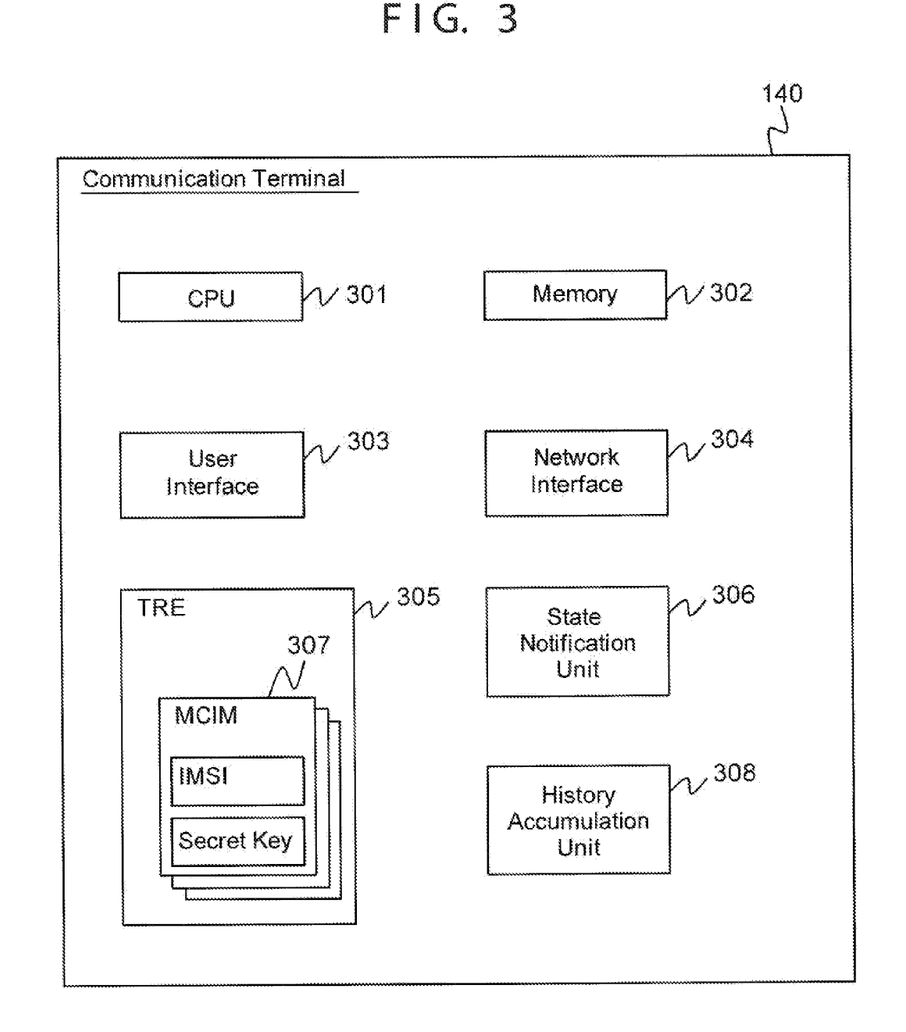
FIG. 3 illustrates an exemplary block diagram of the communication device 140.

FIG. 3 illustrates an exemplary block diagram of the communication device 140. The communication device 140 may comprise a CPU 301, a memory 302, a use interface 303, a network interface 304, a trusted environment (TRE) 305, a state notification unit 306, and a history accumulation unit 308.

The CPU 301 controls overall operations of the communication device 140. The memory 302 stores computer programs and data used for operations of the communication device 140.

The user interface 303 provides an interface with a human such as the user of the communication device 140 and includes a display, a keypad, a speaker, and the like, for example. The network interface 304 provides an interface with other devices such as the ICF 131, the SAM 134, servers in the networks 110, 120 and 130, and the likes. The TRE 305 provides some hardware and software protection and separation for the provisioning, storage, execution, and management of MCIMs. The TRE 302 may have pre-installed PCID and contact information of the ICF 131 and other devices or servers in the RO network 130. MCIMs 307 which have downloaded in the communication device 140 are stored in the TRE 305. Each MCIM 307 includes an IMSI (International Mobile Subscriber Identity) as a subscription identity and a secret key as a part of a credential.

The state notification unit 306 notifies the SAM 134 of information relating to the MCIMs 307. The information to be notified may include an MCIM ID of each MCIM 307 which is currently stored in the TRE 305 and a state of each MCIM 307. The state notification unit 306 may notify the information including in periodical keep-alive messages, may notify the information upon request of the SAM 134, may notify the information when the information has changed, for example when a state of an MCIM has changed, or any combination of them. The address of the SAM 134 may be pre-configured in the communication device 140, or be found via other scheme like DNS look-up.

The history accumulation unit 308 accumulates the above mentioned connectivity patterns and usage patterns of the communication device 140. The state notification unit 306 may notify the connectivity patterns and usage patterns including in periodical keep-alive messages, may notify the connectivity patterns and usage patterns upon request of the SAM 134, or any combination of them.

Figure 4:
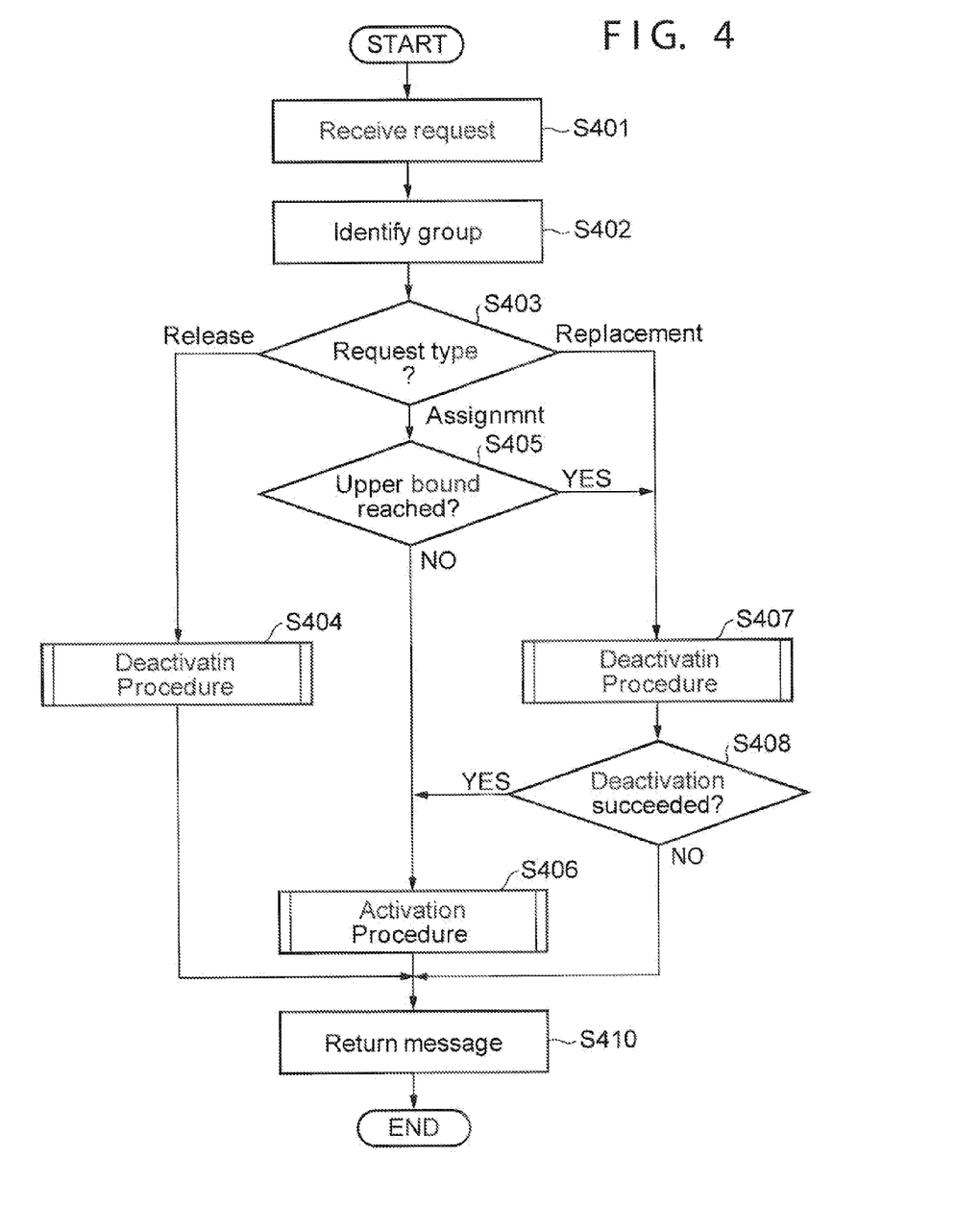
FIGS. 4-6 illustrate operations of the SAM 134 according to some embodiments of the present invention.
Figure 5:
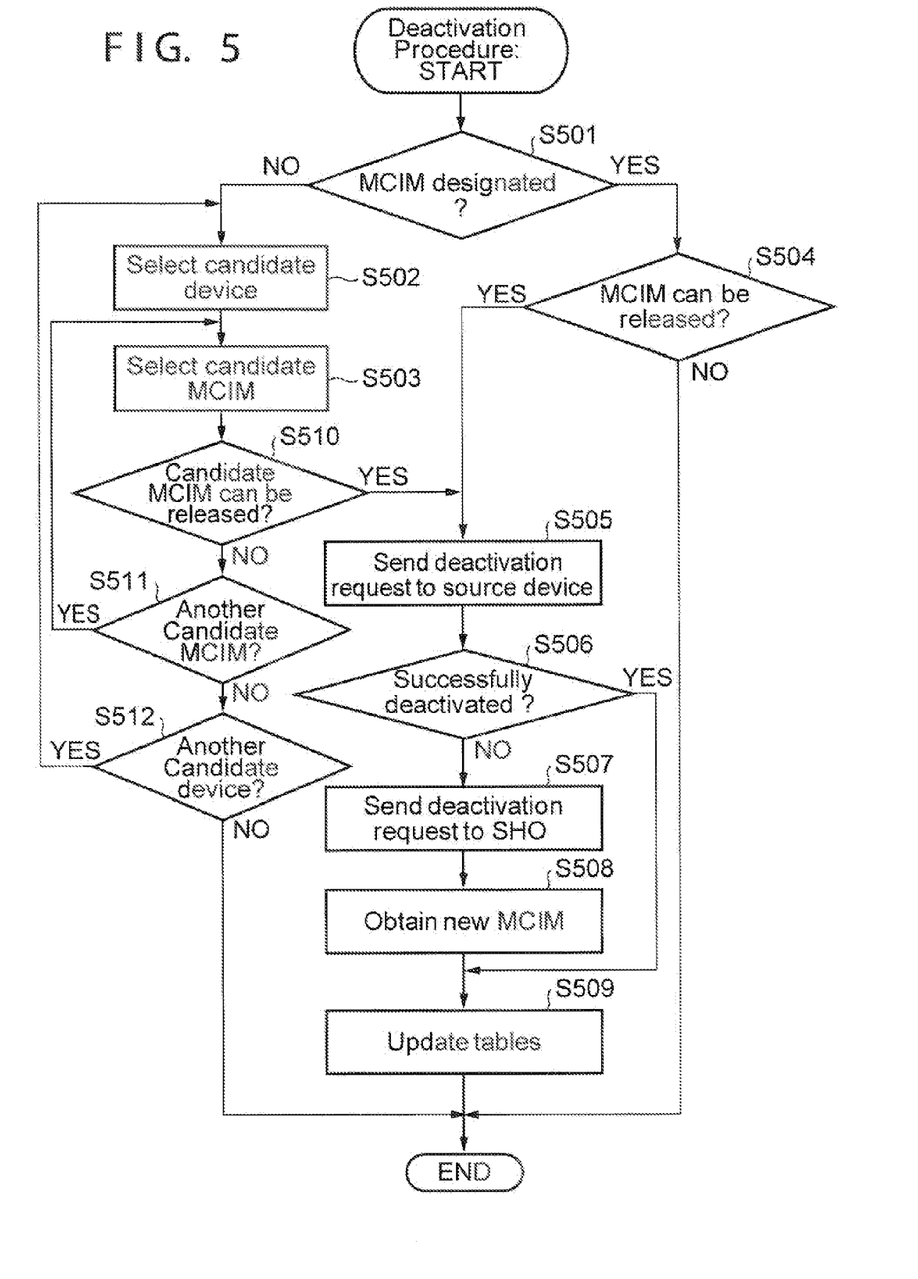
Figure 6:
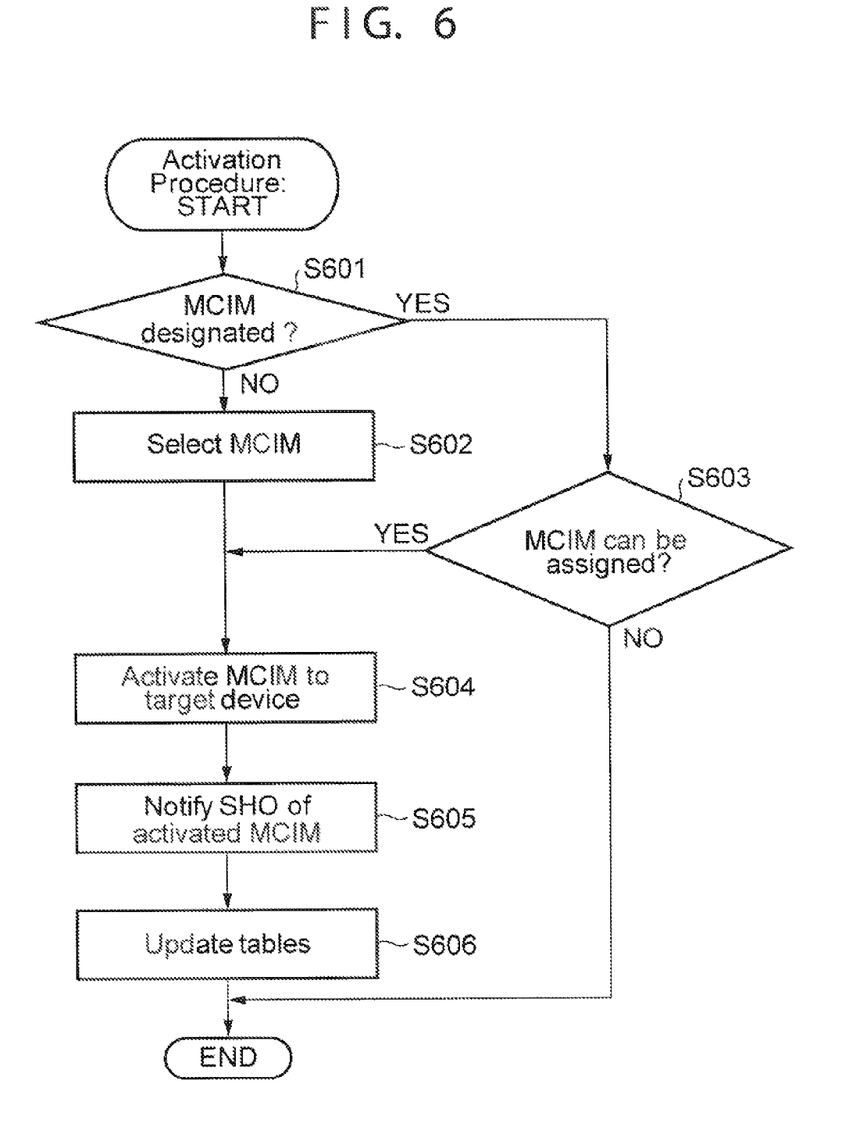

FIGS. 4-6 illustrate operations of the SAM 134 according to some embodiments of the present invention. The CPU 201 included in the SAM 134 executes computer programs stored in the memory 202 to process these operations. FIG. 4 illustrates a main procedure performed by the SAM 134.

In step S401, the request receiving unit 203 receives a request from a requesting device. As described above, the type of the request may be assignment, release, or replacement. The request receiving unit 203 also checks validity of the request, which includes a formality check and a contract check for example, and if the request is valid, forwards this request to the assignment control unit 205. The requesting device may be the user terminal 150, the network server 160, or any of the communication devices 140a-140n. The network server 160 may be the one operated by a service provider and the request regarding the MCIM assignment may be made by the service provider, instead of the user of the concerned communication devices 140. In some embodiments, the request receiving unit 203 may present the subscriber with a list of the MCIMs which are stored in the subscription pool 211 so that the subscriber can designate one or more MCIMs to be used.

In step S402, the assignment control unit 205 identifies a group which includes communication device 140 designated in the request. When the request designates a group ID, the assignment control unit 205 can directly identify the group based on the group ID. When the request designates a source device and/or a target device, the assignment control unit 205 can identify the group by referring the group management table 212 if the source device and/or target device is included in a single device group.

In step S403, the assignment control unit 205 determines a type of the request. When the type is "release", the assignment control unit 205 performs the deactivation procedure in step S404. When the type is "assignment", the assignment control unit 205 determines whether the number of MCIMs currently assigned to the communication devices 140 in the identified device group reaches the upper bound with reference to the group management table 212 in step S405. When the number of MCIMs already reaches the upper bound ("YES" in step S405), the procedure proceeds to step S407 and the assignment control unit 205 performs processes similar to when the request type is "replacement" because an MCIM in another communication device should be deactivated in order to activate an MCIM in the target device. When the number of MCIMs does not reach the upper bound ("NO" in step S405), the assignment control unit 205 performs the activation procedure in step S406.

When the type of the request is "replacement", the assignment control unit 205 performs the deactivation procedure in step S407. In step S408, the assignment control unit determines whether the deactivation procedure in step S407 has succeeded. When the deactivation procedure has succeeded ("YES" in step S408), the assignment control unit 205 performs the activation procedure in step S406. On the other hand, when the deactivation procedure has failed ("NO" in step S408), the assignment control unit 205 skips step S406.

In step S410, the assignment control unit 205 may return a confirmation message to the requesting device based on the result of the activation/deactivation procedure. When the activation/deactivation procedure has succeeded, the assignment control unit 205 may notify successful completion to the requesting device. On the other hand, when the activation/deactivation procedure has failed, the assignment control unit 205 may notify an error to the requesting device.

FIG. 5 illustrates the deactivation procedure performed by the SAM 134 in steps S404 and S407. The SAM 134 performs the deactivation procedure in order to release an MCIM from the source device 140i.

In step S501, the assignment control unit 205 determines whether the received request designates one or more MCIMs to be released. When the request does not designate any MCIMs ("NO" in step S501), the assignment control unit 205 selects one candidate device from the communication devices 140a-140n in the device group 141 in step S502. When the source device 140i is designated, for example when the type of the request is "replacement", the assignment control unit 205 selects the designated source device 140i as the candidate device. In step S503, the assignment control unit 205 selects one candidate MCIM from the MCIMs which are currently assigned to the candidate device. The assignment control unit 205 can identify the current states of the MCIMs assigned to the candidate device by referring the assignment table 208. Instead of or in addition to referring the assignment table 208, the assignment control unit 205 may query the current state of MCIMs to the candidate device via an SMS message for example.

In step S510, the assignment control unit 205 determines whether the candidate MCIM can be released. In some embodiments, the assignment control unit 205 may determine that the candidate MCIM can be released when a candidate MCIM is selected at the step S503 (that is, when the candidate device has at least one assigned MCIM). In other embodiments, the assignment control unit 205 may determine that the candidate MCIM can be released when the state of the candidate MCIM is "activated", that is when the state is not "selected". The subscriber may not want an MCIM whose state is "selected" to be released because the communication using the MCIM will be halted. When the candidate device does not have any MCIMs whose states are "activated", that is, when all MCIMs assigned to the candidate device are of operational use, the assignment control unit 205 determines that the candidate MCIM cannot be released.

When it is determined that the candidate MCIM can be released ("YES" in step S510), the procedure proceeds to step S505. When it is determined that the candidate MCIM cannot be released ("NO" in step S510), the procedure proceeds to step S511. In step S511, the assignment control unit 205 determines whether the candidate device has another candidate MCIM. When it is determined that the candidate device has another candidate MCIM ("YES" in step S511), the procedure proceeds to step S503 to select another candidate MCIM. When it is determined that the candidate device does not have any other candidate MCIMs ("NO" in step S511), the procedure proceeds to step S512. In step S512, the assignment control unit 205 determines whether there is another candidate device in the device group 141. When it is determined that another candidate device is in the device group 141 ("YES" in step S512), the procedure proceeds to step S502 to select another candidate device. When it is determined that no other candidate devices are in the device group 141 ("NO" in step S512), the procedure ends. In this case, the assignment control unit 205 may notify in step S410 the requesting device that there are no MCIMs to be released.

The assignment control unit 205 may randomly select a candidate device and a candidate MCIM in steps S502 and S503. Alternatively, the assignment control unit 205 may select a candidate device and a candidate MCIM in steps S502 and S503 based on the priorities of the MCIMs being currently assigned to the communication devices 140. When there is a communication device 140 which is unreachable from the SAM 134, the assignment control unit 205 may preferentially select the communication device 140 as a candidate device because this communication device 140 may not be used for a while. When there is a communication device 140 which has two or more assigned MCIMs, the assignment control unit 205 may select the communication device 140 as a candidate device because an MCIM is still assigned to the communication device even if one of the MCIMs is released.

When the request designates the MCIM ("YES" in step S501), the assignment control unit 205 determines whether the designated MCIM can be released in step S504. In some embodiments, when the MCIM is assigned to the source device 140i regardless of its state, the assignment control unit 205 may determine that the designated MCIM can be released. In other embodiments, when the MCIM is assigned to the source device 140i and its state is "activated", the assignment control unit 205 may determine that the designated MCIM can be deactivated.

When two or more MCIMs are designated, the assignment control unit 205 determines whether any one of the MCIMs can be released and selects an MCIM to be released from the MCIMs which have been determined to be able to be released. The assignment control unit 205 may select an MCIM in the similar way in step S502.

When the designated MCIM can be released ("YES" in step S504), the procedure proceeds to step S505. When the designated MCIM cannot be released ("NO" in step S504), the assignment control unit 205 exits from the deactivation procedure. In this case, the assignment control unit 205 may notify in step S410 the user terminal 150 that the designated MCIM cannot be released. In other embodiments, when the designated MCIM cannot be released, the procedure proceeds to step S502 and the assignment control unit 205 selects another MCIM which can be deactivated.

Steps S505 to S509 are performed to deactivate the MCIM which is determined to be released through steps S501 to S504. When the source device 140i is not designated, the assignment control unit 205 regards the communication device 140 which is assigned the determined MCIM as the source device 140i.

In step S505, the assignment control unit 205 sends a deactivation request to the source device 140i, for example via the DPF 132. The deactivation request specifies the determined MICM. Upon receiving the deactivation request, the source device 140i deactivate the determined MCIM and as the result the state of the MCIM changes from "activated" (or optionally "selected") to "blocked". In step S506, the assignment control unit 205 determines whether the deactivation in the source device 140i has succeeded, for example based on the response from the source device 140i. When the assignment control unit 205 receives a negative response or does not receive any response from the source device 140i, the assignment control unit 205 may determine that the deactivation in the source device 140i has failed. Before sending the deactivation request, the assignment control unit 205 may send a message such as an SMS message to the source device 140i in order to check if the deactivation request can reach the source device 140i. When the message cannot reach the source device 140i, the assignment control unit 205 may determine that the deactivation in the source device 140i cannot be performed, without sending the deactivation request to the source device 140i.

When the deactivation in the source device 140i has succeeded ("YES" in step S506), the procedure proceeds to step S509. In this case, the source device 140i cannot use the deactivated MCIM in order to attach to the SHO network 110 unless the MCIM is activated again. Thus, the assignment control unit 205 can reuse the deactivated MCIM to assign another communication device 140 in the device group 141. In this case, the MCIMs in the subscription pool 211 may not change.

When the deactivation in the source device 140i has failed ("NO" in step S506), the procedure proceeds to step S507. In this case, the state of the MCIM in the source device 140i still remains "activated" (or potentially "selected"). Thus, the source device 140i can use the MCIM in order to attach to the SHO network 110 and the assignment control unit 205 cannot assign the MCIM to another communication device 140. If the assignment control unit 205 assigns the MCIM, which still remains "activated" in the source device 140i, to another communication device 140, it may happen that two communication devices attempt to attach to the SHO network 110 using the same and one MCIM at the same time. Therefore, in the step S507, the assignment control unit sends a deactivation request to the subscription provisioning server 111 managed by the SHO so as to deactivate the MCIM at the operator side. This ensures that the SHO rejects an attachment from the source device 140i using the deactivated MCIM. The deactivation request specifies the MCIM to be deactivated and may be transferred by the DPF 132. Upon receiving the deactivation request, the subscription provisioning server 111 deactivates the requested MCIM in its HLR 112 and clears up all the mobility and connectivity contexts relevant to the requested MCIM in the SHO network 110.

When an MCIM is deactivated by the subscription provisioning server 111, the assignment control unit 205 cannot reuse the MCIM to assign to another communication device 140. Thus, in step 508, the assignment control unit 205 may discard the deactivated MCIM from the subscription pool 211 and obtain another MCIM from the subscription provisioning server 111 to refill the subscription pool 211. The MCIM to be refilled to the subscription pool 211 and the deactivated MCIM may have the same IMSI and different secret key. In this case, the numbering space of the IMSIs is used efficiently. Alternatively, the MCIM to be refilled to the subscription pool 211 and the deactivated MCIM may have different IMSI and different secret key. The subscription provisioning server 111 may provide the new MCIM to the SAM 134 with confirmation of the deactivation of the requested MCIM.

In step S508, the assignment control unit 205 updates the assignment table 208 and the group management table 212. More specifically, the assignment control unit 205 decreases the number of the currently assigned MCIMs in the group management table 212 and updates the state of the released MCIM in the assignment table 208.

When the source device 140i cannot communicate with the SAM 134 in step S505, for example when the source device 140i is powered-off, the request sent from the assignment control unit 205 to the source device 140i cannot reach the source device 140i. As the result, an MCIM, which was discarded from the HLR 112 and the subscription pool 211, still remains stored in the source device 140i. It leads to inefficient use of the memory space of the TRE 305. Thus, the assignment control unit 205 may clean up such garbage data in the source device 140i.

In some embodiments, the assignment control unit 205 may clean up the garbage data in a Push procedure. The assignment control unit 205 may initiate this procedure after step S507 or at a later time. When discarding an MCIM from the subscription pool 211 in step S507, the assignment control unit 205 creates and stores, with the ID of the discarded MCIM, a list of the communication devices which have the discarded MCIM based on the assignment table 208. The list may include the source device 140i as well as other communication devices 140 in the identified device group 141. The assignment control unit 205 sends a request to delete the discarded MCIM from the TRE 305 to each communication devices 140 in the list. In these embodiments, it is assumed that the communication device 140 returns a response when the communication device 140 successfully deletes the discarded MCIM from its TRE 305. When the assignment control unit 205 receives the response from a communication device 140, the assignment control unit 205 removes the communication device 140 from the list. The assignment control unit 205 repeats sending the request to the communication devices in the list periodically (for example every one minute) until the list becomes empty.

In other embodiments, the assignment control unit 205 may clean up the garbage data in a wait-and-detection procedure. When discarding an MCIM from the subscription pool in step S507, the assignment control unit 205 creates and stores, with the ID of the discarded MCIM, a list of the communication devices which have the discarded MCIM based on the assignment table 208. The list may include the source device 140i as well as other communication devices 140 in the identified device group 141. The assignment control unit 205 waits for a communication device 140 to attach to the RO network 130. When a communication device 140 attaches to the RO network 130, the ICF 131 or the DRF 133 forwards the connectivity information of the communication device 140 to the SAM 134. The assignment control unit 205 compares the communication device 140 with the list and, when the communication device 140 is included in the list, sends an request to the communication device 140 to delete the discarded MCIM from its TRE 305.

In the above procedures, the assignment control unit 205 may send the new MCIM obtained in step S508 with the request to delete the discarded MCIM. When it is found that deactivation of the selected MCIM at the source device 140i succeeds after step S507, the assignment control unit 205 may request the subscription provisioning server 111 to activated the deactivated MCIM so as to reuse the deactivated MCIM.

FIG. 6 illustrates the activation procedure performed by the SAM 134 in steps S406. The SAM 134 performs the activation procedure in order to assign an MCIM to the target device 140j.

In step S601, the assignment control unit 205 determines whether the received request designates one or more MCIMs to be assigned. When the request does not designate any MCIMs ("NO" in step S601), the assignment control unit 205 selects an MCIM from the MCIMs in the subscription pool 211 which are currently unassigned to any communication devices 140. The assignment control unit 205 can identify the current states of the MCIMs in the subscription pool 211 by referring the assignment table 208. Instead of or in addition to referring the assignment table 208, the assignment control unit 205 may query the current state of MCIMs to each communication device 140 in the identified device group 141 via an SMS message for example. At least one MCIM should be unassigned because the deactivation procedure has been performed in step S407 if the number of the currently assigned MCIMs reached the upper bound in step S405.

When the request designates the MCIM ("YES" in step S601), the assignment control unit 205 determines whether the designated MCIM can be assigned in step S603. When the designated MCIM is not assigned to any communication device 140, the assignment control unit 205 determines that the designated MCIM can be assigned. When two or more MCIMs are designated, the assignment control unit 205 determines whether any one of the MCIMs can be assigned and selects an MCIM from the MCIMs which have been determined to be able to be assigned.

When the designated MCIM can be assigned ("YES" in step S603), the procedure proceeds to step S604. When the designated MCIM cannot be assigned ("NO" in step S603), the assignment control unit 205 exits from the activation procedure. In this case, the assignment control unit 205 may notify in step S410 the requesting device that the designated MCIM cannot be assigned. In other embodiments, when the designated MCIM cannot be assigned, the procedure may proceed to step S602 and the assignment control unit 205 may select another MCIM which can be assigned or go back to step S407 to release any one of the designated MCIM(s).

Steps S604 to S606 are performed to activate the MCIM which is determined through the above steps S601 to S603. In step S604, the assignment control unit 205 sends a request to initiate the activation of the determined MCIM to the target device 140j, for example via the DPF 132. When the MCIM is not yet installed in the target device 140j, the activation begins with the procedure for MCIM remote provisioning described in 3GPP TR 33.812. When the target device 140j is attached to the network 130 by way of the initial connectivity with using its PCID or a normal connectivity with using a normal activated MCIM, the DPF 132 and the target device 140j can communicate and thus this activation procedure can complete. The DPF 132 may return a report of the result to the SAM 134. In order to enable a push-based procedure to start activation, the SAM may be able to know the MSISDN or IP address of the communication device 140 to communicate. The assignment control unit 205 may keep track of those addresses in the device information database 210, based on notification from the communication device 140 to the SAM 134.

In step S605, in case that synchronization of the state of the MCIMs between the communication device 140 and the corresponding HLR 112 of the SHO is required, the assignment control unit 205 sends via the DPF 132 a request for the activation to the subscription provisioning server 111 of the SHO and receives a response, so that the SAM 134 can make sure the synchronization of the MCIM state.

In step S606, the assignment control unit 205 updates the assignment table 208 and the group management table 212. More specifically, the assignment control unit 205 increases the number of the currently assigned MCIMs in the group management table 212 and updates the state of the assigned MCIM in the assignment table 208.

The procedures described above with reference to FIGS. 4 to 6 can apply to the cases that the requesting device sends a request for use of one of the already-installed or activated MCIMs in the target device 140j, which may not be stored in the subscription pool 211. In such cases, the assignment control unit 205 responds the request with an answer to permit use of the designated MCIMs. For example, the subscriber instructs the target device 140j to send a request to the SAM 134 to use one of the currently installed or activated MCIMs for the target device 140j. The target device 140j attaches to the network 130 by using a PCID and sends a request message to the SAM 134 via the ICF 131. The assignment control unit 205 selects one of the available MCIMs and returns the permission to the target device 140j to use the selected available MCIM. If the selected MCIM is not yet activated in the target device 140j, then the assignment control unit 205 also sends a request to the DPF 132 to activate the MCIM for the target device 140j. If one of the MCIMs has been deactivated through this step, then the SAM returns the device a permission message to confirm that the device can activate that MCIM to use from now on.

Installation and activation of an MCIM are different actions in the MCIM remote provisioning. Once an MCIM is installed, for example by the procedure defined in TR 33.812, the MCIM can be activated for the communication device 140 to use it to attach itself to the SHO network 110.

In a first scenario, when an MCIM is installed in a communication device 140, the MCIM has already been activated in the corresponding HLR 112. At the installation, the MCIM automatically transitions to the state of "Activated" in the device. This means that the installed MCIM is immediately activated in the device, or the device does not distinguish between "Installed" and "Activated" states. Deactivation of the MCIM is performed by a certain procedure initiated by an entity in the network, for example by the DPF 132 via the initial connectivity based on the PCID. As a result, the MCIM is removed permanently from the communication device 140. Activation of the same MCIM on the same device requires installation of that MCIM.

In a second scenario, when an MCIM is installed in a communication device 140, the MCIM has already been activated in the corresponding HLR 112. However, the MCIM installed in the communication device 140 needs to be activated by a certain procedure initiated by an entity in the network, for example by the DPF 132 via the initial connectivity based on the PCID or via a normal operational connection based on one of the activated MCIM in the device. As a result, the state of the MCIM is changed from "installed" to "activated". The communication device 140 is capable of distinguishing between the "installed" and "activated" states of the MCIMs, for example by maintaining the status table of the MCIMs, so that the device can discern the "installed but not activated" MCIMs and "installed and activated" MCIMs in the memory 302. Deactivation of the "activated" MCIM is performed by a certain procedure initiated by an entity in the network, for example by the DPF 132 via the initial connectivity based on the PCID or via a normal operational connection based on one of the activated MCIMs in the device. As a result, the state of the MCIM is changed from "activated" to "blocked". The "blocked" MCIM can be activated for operational use by a certain procedure initiated by an entity in the network, for example by the DPF 132 via the initial connectivity based on the PCID or via a normal operational connection based on one of the activated MCIMs in the device. As a result, the state is changed from "blocked" to "activated". When necessary, the "blocked" MCIM is deleted permanently by a certain procedure initiated by an entity in the network, for example the DPF 132.

In a third scenario, at point in time when an MCIM is installed in a device, it has not yet been activated in the corresponding HLR 112. In this state, the MCIM is not activated both in the device and in the HLR 112. The key feature of this scenario is that the "activated/deactivated" states of the MCIM are maintained in both device and HLR 112 in a synchronized manner. The MCIM installed in the device needs to be activated by a certain procedure initiated by an entity in the network, for example by the DPF 132 via the initial connectivity based on the PCID or via a normal operational connection based on one of the activated MCIMs in the device. As a result, the state of the MCIM is changed to "activated" in both device and HLR 112. The device is capable of distinguishing between the "installed" and "activated" states of the MCIMs, for example by maintaining a status table of the MCIMs, so that the device can discern the "installed but not activated" MCIMs and "installed and activated" MCIMs in its own memory. Deactivation of the "activated" MCIM is performed by a certain procedure initiated by an entity in the network, for example by the DPF 132 via the initial connectivity based on the PCID or via a normal operational connection based on one of the activated MCIMs in the device. As a result, the state of the MCIM is changed to "blocked" in the device and to "deactivated" in the HLR 112. At the same time, the network entity initiates the operator network to deactivate the MCIM in the corresponding HLR 112. As a result, the MCIM has become deactivated synchronously in both device and HLR 112.

According to the embodiments mentioned above, the subscriber, who may be an end-user or a service provider, can reduce the total cost for subscriptions for the group. This is because the number of available subscriptions for the group can be smaller than the number of the devices within the group, thanks to the SAM 134 according the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus for managing assignment of subscription modules for a group of communication devices, comprising:
 a receiving unit configured to receive a request for assigning a subscription module to a target communication device so that the target communication device can attach to a network managed by a network operator; and
 a control unit configured to
  identify a group, from a plurality of groups, which includes the target communication device,
  determine whether the number of subscription modules which are assigned to the communication devices in the identified group reaches an upper bound,
  when the number of the subscription modules does not reach the upper bound, assign the subscription module to the target communication device, and
  when the number of the subscription modules reaches the upper bound,
   select a subscription module from subscription modules which are assigned to communication devices in the identified group,
   release the selected subscription module from a source communication device to which the selected subscription module is assigned, and
   assign the subscription module to the target communication device,
 wherein, the control unit is further configured to request the source communication device to deactivate the selected subscription module, when releasing the selected subscription module, and
 wherein the control unit is further configured to request the network operator to deactivate the selected subscription module, when it is found that deactivation of the selected subscription module at the source communication device fails or has not been confirmed.

2. The apparatus according to claim 1, wherein the control unit is further configured to, when the request designates the source communication device from which the subscription module is released and which is included in the same group as the target communication device, release the subscription module which is assigned to the source communication device.

3. The apparatus according to claim 1, further comprising an analysis unit configured to manage priorities of the subscription modules which are assigned to the communication devices in the identified group, wherein the control unit is further configured to select a subscription module to be released based on the priorities.

4. The apparatus according to claim 3, wherein the analysis unit is further configured to monitor connectivity or usage patterns of the communication devices in the identified group and determine the priorities based on the monitored connectivity or usage patterns.

5. The apparatus according to claim 1, wherein the control unit is further configured to, when the request designates one or more subscription modules to be released, select one subscription module to be released from the designated subscription modules.

6. The apparatus according to claim 1, wherein
 the control unit is further configured to request the network operator to activate the deactivated subscription module when it is found that the deactivation of the selected subscription module at the source communication device succeeds.

7. The apparatus according to claim 1, wherein
 each subscription module includes a subscription identity and a credential, and
 the control unit is further configured to obtain a subscription module from the network operator, wherein the obtained subscription module and the released subscription module have the same subscription identity and different credentials, and
 the control unit is further configured to use the obtained subscription module to assign to the target communication device.

8. The apparatus according to claim 1, wherein the control unit is further configured to reuse the released subscription module to assign another communication device when the deactivation of the released subscription module at the source communication device succeeds.

9. The apparatus according to claim 1, further comprising a subscription management unit configured to manage subscription assignment in terms of which subscription modules are assigned to the communication devices, wherein the control unit is further configured to perform the determination on whether the number of the subscription modules reaches the upper bound based on the subscription assignment.

10. The apparatus according to claim 1, further comprising a storage device for storing one or more subscription modules for each group of communication devices, wherein the control unit is further configured to select a subscription module to be assigned from the one or more subscription modules stored in the storage device for the identified group.

11. The apparatus according to claim 1, wherein the subscription modules are downloadable to the communication devices.

12. The apparatus according to claim 11, wherein the subscription modules are Machine Communication Identity Modules, MCIMs, or a subscription module used for Embedded SIMs.

13. A method for managing assignment of subscription modules for a group of communication devices, comprising:
 receiving a request for assigning a subscription module to a target communication device so that the target communication device can attach to a network managed by a network operator;
 identifying a group, from a plurality of groups, which includes the target communication device;
 determining whether the number of subscription modules which are assigned to the communication devices in the identified group reaches an upper bound;
 when the number of the subscription modules does not reach the upper bound, assigning the subscription module to the target communication device, and
 when the number of the subscription modules reaches the upper bound, selecting a subscription module from subscription modules which are assigned to communication devices in the identified group, releasing the selected subscription module from a source communication device to which the selected subscription module is assigned, and assigning the subscription module to the target communication device, wherein, when releasing the selected subscription module, requesting the source communication device to deactivate the selected subscription module, and requesting the network operator to deactivate the selected subscription module, when it is found that deactivation of the selected subscription module at the source communication device has failed or has not been confirmed.

14. A method for managing assignment of subscription modules for a group of communication devices, comprising:

receiving a request for assigning a subscription module to a target communication device, to thereby enable the target communication device to attach to a network;

identifying a group of communication devices, from a plurality of groups, to which the target communication device belongs, wherein there is an upper bound on a number of subscription modules that can be assigned to the group;

assigning the subscription module to the target communication device if the upper bound on subscription module assignments has not been reached for the group, and otherwise avoiding exceeding the upper bound on subscription module assignments by releasing a previous subscription module assignment for another communication device in the group in conjunction with assigning the subscription module to the target communication device, wherein, when releasing the previous subscription module assignment, requesting a source communication device to deactivate the previous subscription module assignment, and requesting a network operator to deactivate the previous subscription module assignment, when it is found that deactivation of the previous subscription module assignment at the source communication device has failed or has not been confirmed.

* * * * *